UNITED STATES PATENT OFFICE.

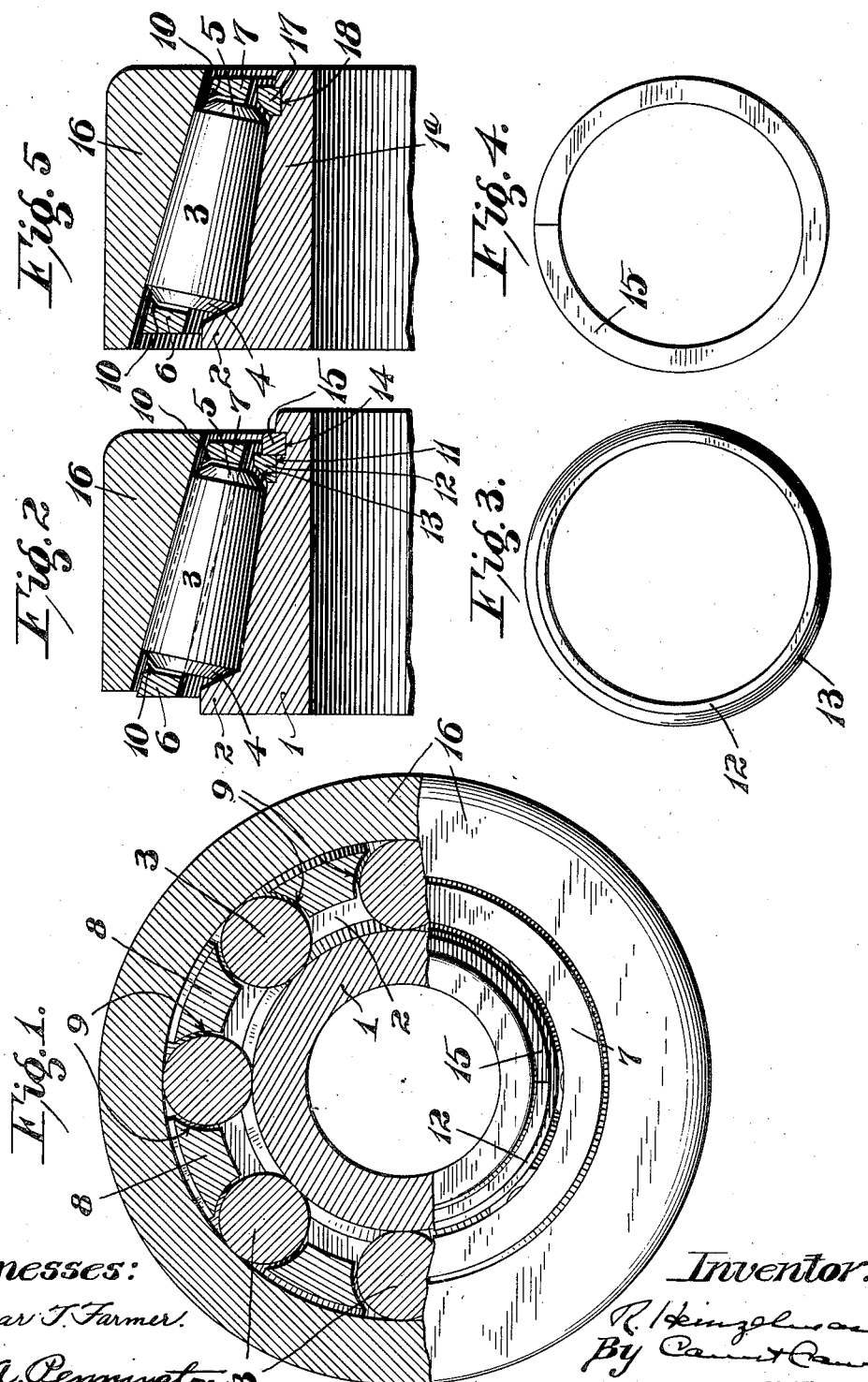

REGINALD HEINZELMAN, OF BELLEVILLE, ILLINOIS, ASSIGNOR TO THE TIMKEN ROLLER BEARING COMPANY, OF CANTON, OHIO, A CORPORATION OF OHIO.

ROLLER-BEARING.

1,102,404.

Specification of Letters Patent.

Patented July 7, 1914.

Application filed July 9, 1909. Serial No. 506,744.

*To all whom it may concern:*

Be it known that I, REGINALD HEINZELMAN, a citizen of the United States, and a resident of the city of Belleville, county of St. Clair, and State of Illinois, have invented a new and useful Improvement in Roller-Bearings, of which the following is a specification.

This invention relates to roller bearings, and more particularly to bearings having conical rollers.

It has for its principal objects to simplify the construction, minimize the number of mechanical operations in the manufacture thereof and decrease the cost; to provide for the retention of the bearing sleeve, rollers and spacing cage assembled when detached as a whole; and to attain certain other advantages hereinafter more fully appearing.

The invention consists in the parts and in the arrangements and combinations of parts hereinafter described and claimed.

In the accompanying drawing forming part of this specification and wherein like symbols refer to like parts wherever they occur, Figure 1 is a view partly in vertical cross section of a roller bearing embodying my invention; Fig. 2 is a fragmentary longitudinal section of the same; Fig. 3 is a face view of a retaining and end thrust bearing ring for the rollers; Fig. 4 is a similar view of a split retaining ring for the roller-retaining ring; and, Fig. 5 is a fragmentary longitudinal section of a bearing of modified construction.

The bearing comprises a conical sleeve or inner bearing piece 1 which is adapted to be mounted on an ordinary shaft or an axle spindle. At the large end of the sleeve 1 is an annular rib 2 whose inner face is inclined or beveled. Surrounding the conical sleeve 1 and bearing thereon are a series of conical rollers 3. The opposite ends of the rollers are beveled as at 4 and 5, respectively, the beveled portion 4 at the larger ends of the rollers corresponding to the inclination or bevel of the annular rib or shoulder 2 on the conical sleeve 1 and being adapted to bear thereagainst.

The rollers are spaced apart by a conical annular cage comprising circular end portions 6, 7, and connecting bars 8, preferably formed integrally. The cage bars 8 are tapered and their sides are undercut as at 9, to correspond to the form of the conical rollers 3. The spaces between the bars 8 are large enough to permit the rollers to fit loosely therein but the width of the open spaces between the cage bars at the circumferential portion thereof is less than the diameter of the rollers. Hence the cage serves to retain the rollers against outward radial movement from the bearing sleeve as well as spacing them apart. It is preferable to provide beveled undercut shoulders 10 at the circumferential portions of the circular end members 6, 7 of the cage between the bars 8 so as to overhang the beveled portions of the rollers. These shoulders 10 are provided so that in case the sides 9 of the cage bars 8 become worn away to such an extent that the rollers will slip out between the bars, said shoulders 10 overhanging the beveled end portions of the rollers will retain them in place.

The conical bearing sleeve 1 is provided beyond the smaller ends of the rollers 3 with a reduced annular portion or groove 11 which is preferably cylindrical. On this reduced annular portion is fitted a ring 12 having its inner circumferential edge portion 13 beveled to correspond to the bevel of the smaller ends of the rollers. Next to the reduced annular portion 11 an annular groove 14 is provided; and in the groove is fitted a split retaining ring 15. This ring is a strong spring which is normally contracted in circular form and of a size when closed to fit snugly in the groove 14. By this arrangement, the bearing, including the conical sleeve, rollers and spacing cage are held intact when removed as a whole from the axle spindle or wheel hub. The rings 12, 15 also receive the end thrust of the rollers at times when the bearing is loosely adjusted in the wheel hub.

Usually the bearings are so adjusted that there is no looseness between the coöperative conical faces of the rollers 3, inner bearing sleeve 1 and a hub bushing or outer bearing piece 16 whose inner face is conical. In some cases, however, it is desirable to have considerable play and sometimes the bearings accidentally work loose; and, consequently, the retaining devices for the rollers ordinarily provided, not being designed to resist end thrust, give way or become so damaged that the bearing is rendered useless.

By providing the ring 12 with the beveled inner circumferential edge portion, the tendency of the rollers whose beveled ends overlie said annular beveled portion of the ring is to hold the same tighter to its seat by a wedging action instead of prying it therefrom as would be the case if the rollers had plain end faces and the ring merely presented a square shoulder to receive the end thrust of the rollers.

In Fig. 5, the beveled ring 12 and the retaining ring 15 therefor are dispensed with. In lieu thereof a single split ring 17 similar to the ring 15 is fitted in a groove 18 provided therefor in the sleeve 1ᵃ. This ring 17 is provided with a beveled inner side like the ring 12; and the same is made so that its ends meet when it is fitted in the groove. A continuous and unbroken thrust bearing shoulder for the rollers is thus provided.

By the construction shown, the necessity of providing end spindles for the rollers is obviated; the cage may be readily constructed as a malleable iron casting; and the number of machine operations are reduced to a minimum. The bearing can be readily assembled and handled or shipped with but little liability of accidentally coming apart, yet with the aid of proper tools the split spring retaining rings may be removed in case it is desired to take the bearing apart.

Obviously the device admits of considerable modification without departing from my invention. Therefore, I do not wish to be limited to the specific construction shown and described.

What I claim is:

1. A roller bearing comprising a spindle ring, a series of rollers arranged around the periphery of said spindle ring and having beveled ends, said spindle ring having an integral retaining flange whose inner face is beveled to correspond with and underlies the beveled end portions of the rollers and said spindle ring also having an annular groove adjacent to the opposite ends of the rollers, and a split spring ring fitted detachably in said annular groove and projecting beyond the bearing face of said spindle ring, said split ring having a beveled inner face corresponding with and underlying the adjacent beveled end portions of the rollers.

2. A roller bearing comprising a conical bearing sleeve having a cylindrical annular reduced peripheral portion near its smaller end and a peripheral groove adjoining said reduced portion, the bottom of said groove being cylindrical and its side walls perpendicular to the axis of the sleeve, a series of rollers arranged around the periphery of said sleeve, the ends of said rollers adjacent to said reduced cylindrical portion being beveled, a ring detachably fitted on said cylindrical reduced portion, the side of said ring adjacent to the ends of the rollers being beveled to correspond therewith, and a split spring ring of square cross section detachably fitted in said annular groove.

3. A roller bearing comprising a bearing sleeve, a series of rollers arranged around said bearing sleeve, said rollers having reduced end portions, an integral annular spacing cage surrounding said bearing sleeve and adapted to space said rollers apart and retain them against radial movement from said bearing sleeve, said cage comprising two rigid annular end members and spaced rigid cross connecting bars, said annular end members having undercut shoulders at the circumferential portion of their inner sides adapted to overhang the respective reduced end portions of said rollers.

4. A roller bearing comprising a conical bearing sleeve, a series of conical rollers arranged around said conical bearing sleeve, the end portions of said rollers being beveled, a conical annular spacing cage surrounding said conical bearing sleeve and adapted to space said rollers apart and retain the same against radial movement from said bearing sleeve, said cage comprising two rigid annular end members and spaced rigid cross connecting bars, said annular end members having beveled undercut shoulders at the circumferential portion of their inner sides adapted to overhang the respective beveled end portions of said rollers.

5. A roller bearing comprising a retaining cage consisting of annular end portions and spaced bars connecting said end portions, and rollers in the respective spaces, the ends of the rollers being beveled and the end members being undercut at the ends of said spaces to overhang the beveled ends of the respective rollers.

6. A roller bearing comprising a rigid integral retaining cage consisting of annular end portions and spaced bars connecting said end portions, and rollers in the respective spaces, the ends of the rollers being beveled and the end members being undercut at the ends of said spaces to overhang the beveled ends of the respective rollers.

7. A roller bearing comprising a hollow inner bearing member adapted to be detachably mounted on a spindle and having a shoulder at one end thereof and an annular member detachably secured thereto near its opposite end, a rigid spacing cage having openings adapted to receive rollers loosely therein and retain them against outward radial movement, and rollers in said openings bearing against said inner bearing member, all arranged so that said annular member may take up the end thrust of the rollers and serve as a retaining means therefor.

8. A roller bearing comprising a hollow inner bearing member adapted to be detachably mounted on a spindle and having a shoulder at one end thereof and an annular member detachably secured thereto near its opposite end, a rigid spacing cage having openings adapted to receive rollers loosely therein and retain them against outward radial movement, and rollers in said openings bearing against said inner bearing member, all arranged so that said annular member may take up the end thrust of the rollers and serve as a retaining means therefor, the ends of said rollers being beveled, and the cage being undercut at the ends of said openings to overhang the ends of the rollers, and the annular member being also beveled to coöperate with the beveled ends of the rollers.

Signed at St. Louis, Mo., this 6th day of July, 1909.

REGINALD HEINZELMAN.

Witnesses:
G. A. PENNINGTON,
J. B. MEGOWN.